United States Patent

[11] 3,612,998

| [72] | Inventors | Bernus G. Turner<br>Kent;<br>John H. Olsen, Vashon; Theodore R. Beck, Seattle; Derek W. Mahaffey, Bellevue, all of Wash. |
|---|---|---|
| [21] | Appl. No. | 42,167 |
| [22] | Filed | June 1, 1970 |
| [45] | Patented | Oct. 12, 1971 |
| [73] | Assignee | The Boeing Company<br>Seattle, Wash. |

[54] ELECTROKINETIC CORROSION MEASURING APPARATUS AND METHOD
7 Claims, 2 Drawing Figs.

[52] U.S. Cl. .................................................. 324/71 C,
73/86, 324/71 E
[51] Int. Cl. .................................................. G01r 27/00
[50] Field of Search ............................................ 324/71 R,
71 C, 71 E; 73/86; 338/13; 307/95; 204/1 R, 1 T,
196; 23/230 C, 253 C

[56] References Cited
UNITED STATES PATENTS

| 3,342,064 | 9/1967 | Blattner ........................ | 73/86 |
| 3,250,117 | 5/1966 | Dajani .......................... | 73/86 |

*Primary Examiner*—Rudolph V. Rolinec
*Assistant Examiner*—Ernest F. Karlsen
*Attorneys*—Glenn Orlob and Kenneth M. MacIntosh ABSTRACT: Hydraulic fluid having the characteristic of forming an electrical double layer in a hydraulic system and a resulting streaming current is subjected to a severe shear variation in the vicinity of an electrode surface in contact with the fluid whereby the charged species of the diffuse layer of the electrical double layer that are swept away by the shear variation are replaced by charged species flowing from the electrode into the fluid thereby inducing an electrical current in the electrode which is measured as a determination of the electrokinetic corrosion characteristics of the fluid.

PATENTED OCT 12 1971

3,612,998

INVENTORS,
BERNUS G. TURNER
JOHN H. OLSEN
THEODORE R. BECK
DEREK W. MAHAFFEY
BY
Kenneth M. MacIntosh
ATTORNEY

ELECTROKINETIC CORROSION MEASURING APPARATUS AND METHOD

CROSS-REFERENCE TO RELATED APPLICATIONS

The subject matter of this application is related to that contained in the applications entitled "Method of Controlling Streaming Current Driven Electrokinetic Corrosion Current in Phosphate Ester Based Hydraulic Fluids" by Theodore R. Beck, Derek W. Mahaffey, and John H. Olsen; said application having Ser. No. 421,123, filed June 1, 1970.

BACKGROUND OF THE INVENTION

This invention relates to an apparatus and method for determining the electrical erosivity or electrokinetic corrosion characteristics of a hydraulic fluid under conditions commonly found in high-pressure airplane hydraulic systems.

All high-pressure hydraulic systems, whether installed in airplanes, land vehicles, or elsewhere, are subject to wear and metal removal, that is commonly known as erosion, in many critical areas of the system. When this erosion occurs on the control edges of a valve or other metering devices in a hydraulic system, high leakage results which may eventually lead to loss of control of the valve flow gain and pressure gain, as well as instability of the mechanism under control and destructive overheating of the entire hydraulic system. These problems are generally associated with the typical properties of the hydraulic fluids used in the system as well as any contamination which may be present in the fluid.

Considerable effort has been spent to develop a solution to the problem of material removal at the metering edges of hydraulic system control devices. These efforts have been expended along two general lines. In certain cases, harder, tougher, and more abrasive resistant materials have been developed for the fabrication of the metering edges of the hydraulic control devices, or these metering edges have been designed with more elaborate physical configurations in an attempt to reduce the hydraulic fluid flow characteristics that were thought to be the cause of the material removal. Certain materials and configurations did show an increased ability to resist erosion but it was doubtful whether the attempt was successful in view of the considerably increased cost in either the material itself or its fabrication. In another direction, attempts were made to control the properties of the hydraulic fluid itself. A certain degree of success was obtained by filtering the fluid with Fuller's earth filters or molecular sieves, and by the use of various additives. However, these controls have not gained widespread practical use in airplanes and other hydraulic systems because there is no convenient way of telling when the filters or additives are of continued benefit since it has been found that their efficacy in the hydraulic fluid is not a strict function of time or system operation.

SUMMARY OF THE INVENTION

It is therefore an object of this invention to provide a method and apparatus for determining the electrokinetic corrosion characteristics of a fluid.

It is yet another object of this invention to provide a method of determining the electrokinetic erosivity of a hydraulic fluid in a hydraulic system, thus enabling the establishment of an effective preventing maintenance schedule for the system.

It is a further object of this invention to provide a method and apparatus for measuring the electrokinetic corrosion current in a hydraulic fluid when subjected to conditions comparable to those experienced by the fluid in a hydraulic system and thus determined the erosivity of the fluid.

These and other objects of the invention are obtained by sampling a portion of the hydraulic fluid and conducting it to wall surface that is made of a specified material with respect to which the electrokinetic corrosion characteristics of the fluid are to be determined. Near the wall surface, the fluid will form an electrical double layer with a first layer of ions of one charge being bound to the wall surface and a second layer of ions of the opposite charge being diffusely dispersed apart from the wall surface.

The fluid in the vicinity of the electrical double layer is then subjected to a shear variation causing an entrainment and sweeping away of the ions of the diffuse layer at a rate faster than they can be replaced from the bulk of the fluid. The population density of the ions in the diffuse layer is maintained by the flow of ions of the wall surface and the flow of these ions constitutes an electrical current representative of the electrokinetic corrosion properties of the fluid with respect to the wall material.

For purposes of these measurements, the shear variation can be induced by flowing the fluid through an orifice near an electrode made of the specified material and suitable electrical current measuring apparatus connected to the electrode measures the electrokinetic corrosion current.

DESCRIPTION OF THE PREFERRED EMBODIMENT

Figure 1:
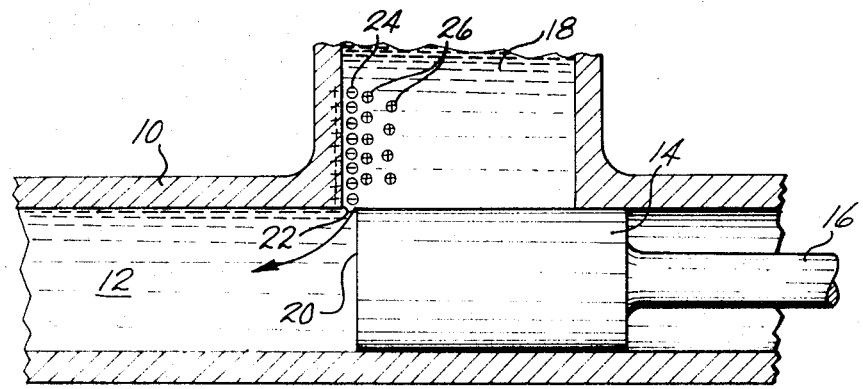
FIG. 1 is a schematic representation of a typical valve used in high-pressure hydraulic systems illustrating the electrokinetic phenomenon occurring at the metering edge of the valve.

FIG. 1 is a schematic representation of a slide and sleeve servovalve typically found in an airplane hydraulic control system. The electrokinetic corrosion phenomenon to which this invention is directed is found in the metering and control devices of all sorts in airplane hydraulic systems and not just in the slide and sleeve type servo valve shown in FIG. 1 and is also found to occur in the elements of hydraulic systems other than those used in airplane. Electrokinetic corrosion phenomenon is found in all types of fluids that may be used in high-pressure hydraulic systems, even though in those hydraulic systems using the hydrocarbon-based hydraulic fluids the phenomenon may occur at such low levels as to be masked by other corrosion mechanisms operating in those systems and thus not be readily recognizable. For illustrative purposes, the more extreme case of electrokinetic corrosion will be presented herein; that is, with the use of synthetic phosphate ester based hydraulic fluids in a high-pressure airplane hydraulic systems at the metering edges of a slide and sleeve servovalve of the type illustrated in FIG. 1.

The valve of FIG. 1 comprises sleeve body 10 having bore 12 therein and an inlet port 18 intersecting bore 12. Slideably fitted within bore 12 near he intersection with port 18 is slide member 14 having a control rod 16 connected thereto. Slide 14 may be moved longitudinally within bore 12 so as to completely block inlet port 18 or to partially or completely open inlet port 18 to allow the fluid to flow therefrom into bore 12. Inlet portion 18 is typically connected to the pump side of a hydraulic system (not shown) and in the case of airplane hydraulic systems may contain fluid under a pressure of up to 3,000 p.s.i., while the downstream or return side of the hydraulic system to which bore 12 may be connected would be at a pressure of approximately 300 p.s.i. The amount of hydraulic fluid that will flow between inlet port 18 and bore 12 is controlled by the positioning of slide 14 at the intersection of inlet port 18 and bore 12 and, more particularly, by the relative positioning of surfaces 20 and 22 of slide 14 and sleeve body 10, respectively, commonly known as the metering edges of the valve. It should be recognized, that even with slide 14 completely closing inlet port 18, there is some fluid flow due to the tolerance of fit of slide 14 within bore 12. With valve in new condition, this nominally closed position leakage rate may be approximately 100 cc. per minute. It can be seen that if metering surfaces 20 and 22 are damaged by corrosion or other effects, the leakage rate of the valve when in the nominally closed position will rise considerably. In the extreme, the leakage rate may become so great that the entire hydraulic system pump capacity is consumed in maintaining the leakage flow, thus leaving no capacity for hydraulic control.

While damage to the metering edges of the hydraulic valve may be caused by many factors such as the cavitation of hydraulic fluid flowing through the valve, mechanical erosion caused by particulate matter or contamination within the hydraulic fluid, or metal removal by the discharge of the electrical charge in the vicinity of the metering edges, it has been found that even where the valve configuration has been designed to eliminate cavitation, where the hydraulic fluid has been carefully filtered to remove particulate contamination, and where there is no evidence of electrical discharge, severe erosion has still occurred with the use of certain hydraulic fluids even where the valve itself is fabricated from hardened steel.

Careful investigation has shown that the metal removal taking place in these instances is due primarily to an electrokinetic phenomenon occurring between the fluid and the wall surfaces of the valve as the fluid undergoes particularly severe shear variations while flowing through the valve. Positive and negative species, or ions, contained within the fluid will, in general, differ in their adsorption on the metal wall surfaces of the valve. For example, in FIG. 1, there is shown a layer of negative ions 24 adsorbed on and bound to the interior wall surface of inlet port 18 upstream of the metering edges 20 and 22 of the valve. Depending upon the composition of the hydraulic fluid and the material from which the valve structure is made, the adsorbed layer may be of either negative or positive species but for the sake of illustration it is assumed that a layer of negative ions is adsorbed on the metal wall surface. The total charge of bound layer ions 24 creates an electric field which draws species of the opposite charge, i.e., positive ions 26, from the bulk of the fluid toward the wall surface. At the same time, molecular diffusion within the bulk of the fluid tends to spread the positive species evenly throughout the fluid and the balance between the electrical conduction of the fluid and diffusion kinetics determines the thickness of the resulting exponential distribution of the free charge in the diffuse outer portion of this double layer. Since the electrical double layer comprising the bound layer of ions 24 and the diffuse layer of ions 26 is usually very thin (perhaps of only a few hundred angstroms in thickness in phosphate ester hydraulic fluids) relative to the hydrodynamic boundary layer, the velocity profile of the fluid motion parallel to the interior wall surfaces of inlet port 18 will sweep the positive ions 24 of the diffuse layer downstream resulting in an electrical current which, in the art, is called the streaming current. The negative ions 24 will remain generally bound to the wall surface.

It is known in the prior art that the magnitude of the streaming current per unit length, $J_s$, flowing in the double layer can be expressed as $$J_s = \epsilon \epsilon_o \zeta \kappa \quad (1)$$

where:
$\epsilon$ = fluid dielectric constant
$\epsilon_o$ = permittivity of free space
$\zeta$ = potential between bound layer and bulk of fluid
$\kappa$ = velocity gradient normal to wall As can be seen from equation 1, the streaming current depends only on the potential difference $\zeta$ between the bound charge layer comprising ions 24 on the metal wall surface and the fluid outside the diffuse layer comprising positive ions 26.

Equation 1 is descriptive of the streaming current in those cases where the fluid flow is parallel shear flow and where the velocity gradient of the fluid normal to the wall surface is constant along the direction of flow. However, as the fluid flowing in inlet port 18 of FIG. 1 passes through the opening formed by the metering edges 20 and 22 of the valve into bore 12, it is apparent that the fluid flow will no longer be parallel shear flow but that there will be considerable shear variations as the fluid is accelerated past the metering edges. If the length scale for the variations in $\kappa$, the velocity gradient normal to the wall, is much larger than the double layer thickness, equation 1 can be used to relate local value of the flow parameters and the streaming current, $J_s$, can be regarded as the surface current flowing in a thin sheet. However, conservation of electrical charge requires that a divergence of the surface current by compensated by an electrical current flow normal to the surface current from either the fluid, $J_f$, of from the metal wall surface, $J_w$, or both. If $\kappa$ varies only with the direction of flow, this principle of conservation of electrical charge can be expressed as:

$$J_w - J_f = \frac{\partial J_s}{\partial x} = \epsilon \epsilon_o \zeta \frac{\partial K}{\partial x} \quad (2)$$

where $x$ is the cartesian coordinate in the direction of flow. Here, $\zeta$ has been assumed to be constant and measurements have shown that this is a good approximation for low velocities as well as for the higher velocities experienced in the fluid flow through valve structures of the type illustrated in FIG. 1.

The resistance to the flow of electrical current from the metal normal to the streaming current, $J_w$, depends upon the reaction kinetics at the metal wall surface and the resistance of any deposited films that may exist thereon. The resistance to the flow of the electrical current normal to the streaming current from the fluid, $J_f$, depends primarily upon the fluid conductivity. If the conductivity of the fluid is sufficiently low, $J_f$, will be negligible. In that case, the density of the electrical current flowing from the metal wall surface, $J_w$, normal to the streaming current is:

$$J_w = \epsilon \epsilon_o \zeta \frac{\partial K}{\partial x} \quad (3)$$

It has been found that the electrical current flowing from the metal wall surface $J_w$, causes electrochemical reactions at the interface of the metal wall surface and the fluid, producing corrosion of the metal surface. As the positive ions 26, as seen in FIG. 1, are swept downstream and accelerated past the metering edges 20 and 22 of the valve structure, the electrical balance between the layer of bound charges 24 and the layer of diffuse charges 26 is disturbed. If the acceleration of the fluid is severe enough, i.e., if there is a high variation in shear as the fluid flows past the metering edges, the electrical balance must be restored by supplying additional positive charges to replace those that are swept away. There are two sources of such positive charges: (1) from the bulk of the fluid, and (2) from the bulk metal structure underlying the wall surface. If the resistivity of the fluid is high, insufficient ions will be available from the bulk of the fluid to replace those swept past the metering edges. However, if the wall surface is reasonably clean, the resistance to the flow of ions from the metal wall surface into the fluid will be quite low and the additional positive ions will be supplied from that source resulting in an electrochemical reaction at the wall. A typical equation for such a reaction in the case of a valve structure made of steel is:

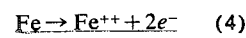

$$Fe \rightarrow Fe^{++} + 2e^- \quad (4)$$

In this instance, the supplying of the $Fe^{++}$ ions results in the corrosion of the metal wall surface and it is the flow of these ions that constitutes the electrokinetic corrosion current. Because the shear variation is greatest at the metering edges of the valve structure, this corrosion has been found to be particularly severe at those locations in valves commonly used for aircraft high-pressure hydraulic systems using the phosphate ester based hydraulic fluids. This corrosion mechanism is so severe and unpredictable that metering devices have been damaged to the extent of becoming unserviceable after only a relatively short period of normal operation. Some extreme cases on record have exhibited a significant degree of corrosion compromising the serviceability of the apparatus within an operating period of 4 to 8 hours.

Because the corrosive action of the hydraulic fluid upon the servovalve and other components of a hydraulic system cannot be predetermined on the basis of hours of operation or the operating conditions of the hydraulic equipment, it is apparent that there exists a need for a method of measuring the corrosivity of the hydraulic fluid in order to provide an indication for the implementation of maintenance programs. Otherwise, maintenance steps such as replacement of the hydraulic fluid will have to be performed on a relatively short term basis even though the hydraulic fluid at that time may not process severe corrosion characteristics. On the other hand, it is not desirable to wear until destructive corrosion of certain components of the hydraulic system have occurred before taking preventive maintenance steps.

This invention provides a means for determining the electrokinetic corrosion characteristics of the hydraulic fluid, either continuously during the normal operation of the hydraulic system or at intermittent intervals according to the convenience and preference of the user. The determination may be made either by the incorporation of specific apparatus directly within the hydraulic system or, as in the embodiment shown in FIG. 2, a separate apparatus may be provided for connection to the hydraulic system or for the testing of hydraulic fluids independent of the actual hydraulic system operation.

Figure 2:
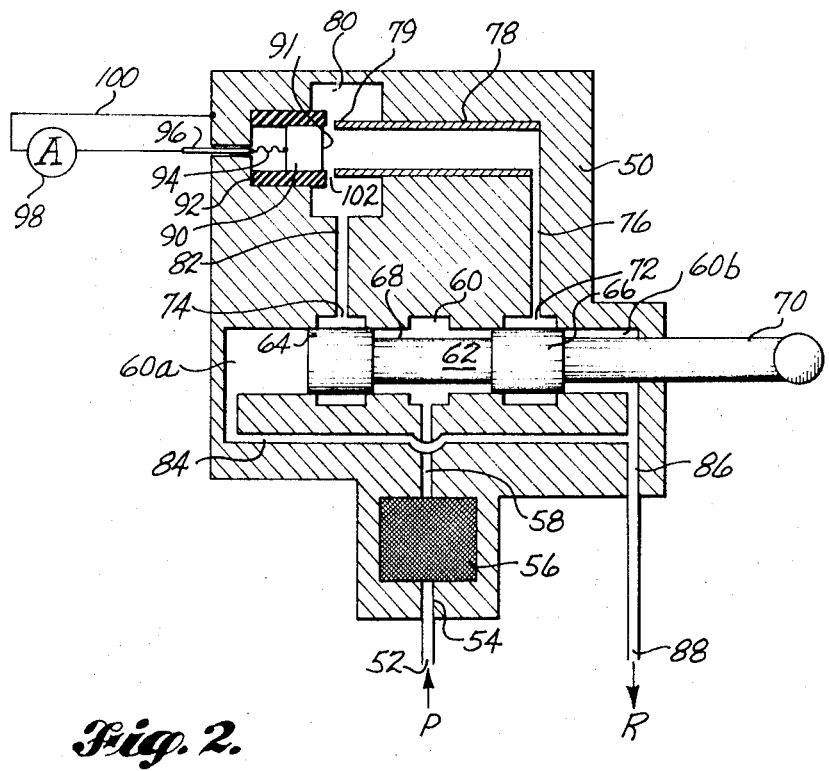
FIG. 2 is a sectional view of an apparatus of this invention which can advantageously be used to measure the electrokinetic corrosion characteristics of a hydraulic fluid.

As shown in FIG. 2, the separate measurement apparatus is seen to comprise housing 50 having an inlet port 52 for receiving the hydraulic fluid, the corrosive characteristics of which are to be determined. Inlet port 52 may be connected directly to the pump side of the hydraulic system for continuous flow of the hydraulic fluid to the measurement apparatus of FIG. 2. Alternatively, the apparatus of FIG. 2 may be a portable unit that is not permanently attached to the hydraulic system but which may be intermittently connected thereto, or to several hydraulic systems, to ascertain the characteristics of the hydraulic fluid used therein. Inlet port 52 is connected by inlet channel 54 to filter 56 which removes solid particulate material from the hydraulic fluid. After passing through filter 56 the hydraulic fluid is conducted through channel 58 to cavity 60 having therein a shuttle valve 62 which comprises two enlarged cylindrical portions 64 and 66 interconnected by a reduced diameter-cylindrical portion 68 and with an operating shaft 70 extending therefrom and through an aperture in the wall of housing 50.

Shuttle valve 62 is adapted for axial longitudinal movement within cavity 60 so as to provide valving functions for the control of the hydraulic fluid flow through subsequent portions of the apparatus of FIG. 2. In particular, with the valve in the position shown in FIG. 2 the hydraulic fluid will not be permitted to escape from cavity 60. However, if the shuttle valve 62 is moved axially to the measuring position to the right as shown in FIG. 2, enlarged cylindrical portion 66 will uncover port 72, and enlarged cylindrical portion 64 will open port 74. In this position, channel 58 will be in flow communication with port 72 through cavity 60, permitting the hydraulic fluid to flow through channel 76 and into flow tube 78. After flowing through flow tube 78, the hydraulic fluid enters chamber 80 and returns via channel 82, port 74, to end portion 60a of shuttle valve cavity 60. From 60a, the hydraulic fluid then returns via connecting channel 84 and outlet channel 86 to outlet port 88 which is normally connected to the return line of the hydraulic system.

The actual determination of the electrokinetic corrosion characteristics of the fluid is made by measuring certain electrochemical phenomena of the fluid in chamber 80 as the fluid is therein subjected to specified flow conditions. When shuttle valve 62 is in the operating position, to the right as shown in FIG. 2, the hydraulic fluid is conducted to chamber 80 through flow tube 78 as discussed above. Also positioned in chamber 80, in close proximity to the downstream and 79 of flow tube 78, is a target electrode 90 made of a material with respect to which the corrosion characteristics of the fluid is to be determined. Target electrode 90 is insulated from housing 50 by an insulation sleeve 92 and has a surface 91 exposed to the impinging flow of fluid issuing from the downstream end 79 of flow tube 78. Attached to the other face of target electrode 90 is an electrical lead 94 which is led by suitable feed through means 96 through the wall of housing 50 to an electrical current measuring meter 98. Return electrical lead 100 is connected between housing 50 and the other side of electrical current measuring meter 98. As can be seen with reference to FIG. 2, target electrode 90 is positioned within chamber 80 so that surface 91 thereof is spaced apart from the downstream end 79 of flow tube 78 leaving a gap 102 therebetween. Gap 102 may be only a few thousandths of an inch but it is illustrated in FIG. 2 in exaggerated form for purposes of clarity. As the hydraulic fluid flows through flow tube 78 and out the downstream end 79 thereof, it is subjected to considerable acceleration and shear variation as the fluid flows through the gap 102 between the downstream end 79 of flow tube 78 and the facing surface 91 of target electrode 90. The sizing of gap 102 between these two elements is selected so as to induce flow characteristics within the hydraulic fluid that are comparable to those experience by the hydraulic fluid in a typical hydraulic system with respect to fluid acceleration and shear variation.

Because of the differential surface adsorbtivity characteristics of the various species contained in the hydraulic fluid, a charged species of one sign will be adsorbed onto the surface of the various components of the hydraulic system including surface 91 of target electrode 90 which is exposed to the hydraulic fluid. Electrical balance is retained by the formation of a diffuse layer of charged species of the opposite electrical sign thus forming an electrical double layer near surface 91 of target electrode 90. As the hydraulic fluid is accelerated through gap 102 between surface 91 and the downstream end 79 of flow tube 78, the charged species of the outer diffuse layer of the electrical double layer are swept away at such a rate that additional charged species cannot be supplied from the bulk of fluid in order to maintain the population density of the diffuse layer in the vicinity of surface 91 necessary for electrical balance. Electrical balance is therefore restored by supplying charged species from the bulk of the metal of target electrode 90. As these charged species of the target material go into the solution, there remains in the bulk of the metal of target electrode 90 an excess of electrons which flow via conduit 94 to current meter 98. The flow of electrons as measured by current meter 98 is indicative of magnitude of a flow of charged species from the bulk metal of target electrode 90 into the hydraulic fluid to maintain the electrical balance. This flow of charged species from target electrode 90 represents an eating away or corrosion of the material of target electrode 90, and this flow of charged species is termed the electrokinetic corrosion current.

The magnitude of the electrokinetic corrosion current is dependent upon many factors including the temperature and viscosity of the hydraulic fluid, the acceleration or shear variation to which the hydraulic fluid is subjected and any impurities that may be present in the hydraulic fluid. Thus, in order for the apertures of FIG. 2 to be effective for determining the electricalkinetic corrosion properties of a hydraulic fluid in a hydraulic system, it is preferable that the hydraulic fluid of the operative system be sampled directly into this apparatus. Calibration can then be provided by sizing gap 102 between downstream end 79 of flow tube 78 and face 91 of target electrode 90 to be such as to subject the fluid to a shear variation that is comparable to the shear variations encountered by the hydraulic fluid in the operative hydraulic system. The current meter 98 will then give an indication of the electrokinetic corrosion current in the test apparatus which will be indicative of the electrokinetic corrosion phenomena occurring in the operative hydraulic system.

It has also been found, that the calibration of the instrument may be maintained over selected temperature ranges if flow tube 78 is made of a material having a temperature coefficient of expansion which allows the gap 102 to vary with temperature in a manner to compensate for the change in viscosity characteristics of a hydraulic fluid with temperature In this manner, the size of the gap 102 between the downstream end 79 of flow tube 78 and surface 91 will change to compensate for the viscosity changes occurring in the hydraulic fluid due to changes in temperature, thus preventing the masking out of deviations in the electrical signal proportional to changes of the erosivity characteristics due to temperature change effects.

Because the size of gap 102 is critical in measuring the electrokinetic corrosion current of the fluid in the apparatus of FIG. 2, provision has been made in that apparatus to prevent the blocking or occluding of gap 102 due to small particles that may be present in the hydraulic fluid despite the presence of inlet filter 56. Shuttle valve 62 is therefore provided with another, or backflushing, position to the left as shown in FIG. 2, which causes the hydraulic fluid to flow from cavity 60 through port 74 to chamber 80 to backflush gap 102. The fluid is then conducted through flow tube 78 and channel 76 to end portion 60b of cavity 60. End portion 60b is in flow communication with outlet port 88 through outlet channel 86. In this manner, the flow of the hydraulic fluid through gap 102 can be reversed to dislodge particulate materials clogging the gap. In operation, it has been found desirable to make a first reading of meter 98 with shuttle valve 62 moved to the right in the operating position followed immediately thereafter with a backflushing of the gap 102 by moving the shuttle valve 62 to the left or backflushing position. The shuttle valve 62 is then returned to the operating or right-hand position and a second reading of meter 98 taken. If any material had been removed from gap 102 by the backflushing flow, the two successive readings of meter 98 will differ markedly. The procedure is then repeated until any marked difference in two successive readings disappears. At that point it can be assumed that the readings are not being affected by the accumulation of any contaminating material in gap 102.

When has been provided, then, by this invention is an apparatus for determining the electrokinetic corrosion properties of hydraulic fluids by sampling the hydraulic fluid and subjecting it to flow conditions representative of those present in high-pressure hydraulic systems to induce within the sampled fluid electrokinetic phenomena which have been found to be responsible for the oftentimes rapid and unpredictable corrosion of metering surfaces within high-pressure hydraulic systems. Electrical measurements are then made of parameters which have been found to be directly related to, or at least determinative of, the corrosion characteristics of the fluid in a high-pressure hydraulic system. In the particular embodiment shown, a sample of the hydraulic fluid is caused to flow through a flow tube 78 and to escape therefrom though a small orifice or gap 102 between the downstream end 79 of flow tube 78 and the surface 91 of target electrode 90 in order to produce a region of shear variation in the electrical double layer of the hydraulic fluid near and generally uniformly across the surface 91 of target electrode 90. The severe shear variation thus generated, strips away the charged species from the diffuse layer of the electrical double layer at such a rate that the population density of the electrical double layer cannot be maintained by the normal supply of charged species flowing in the streaming current in the hydraulic fluid. The deficiency of the charged species in the diffuse layer of the electrical double layer is thus made up from charged flowing from the surface 91 of target electrode 90 normal to the streaming current in the fluid thereby causing an electrokinetic corrosion current that has been found to be determinative of the corrosion of surface 91. When the electrokinetic corrosion current consists of charged species of the metal of the target electrode 90, there is left in the bulk metal of the target electrode 90 an excess of electrons which flow via electrical lead 94 to current measuring apparatus 98 whereby this current is measured as an indication of the electrokinetic corrosion activity occurring at the surface 91 of target electrode 90. In this manner, flow characteristics normally existent in a high-pressure hydraulic servovalve are duplicated in order to induce the corrosion-causing electrochemical phenomenon whereby a measure of the electrokinetic activity can be made as an indication of the corrosion properties of the hydraulic fluid. When the electrokinetic corrosion activity as measured in this manner reaches predetermined levels, proper maintenance activity such as replacement or special treatment of the hydraulic fluid can be undertaken in order to insure continued serviceability of the hydraulic system.

In certain applications it may be desirable to incorporate electrode 90 directly into a hydraulic system, positioned near a metering edge, orifice, or other device which normally generates a shear variation in the fluid conducive to electrokinetic corrosion. In other instances, the apparatus of FIG. 2 may be used independently of any operative hydraulic system as a test apparatus for various fluid formulations or fluid additives.

While the apparatus of this invention finds particular suitability for the testing of hydraulic fluid in modern aircraft, it can also be used in conjunction with any other hydraulic apparatus where electrokinetic corrosion has presented problems of maintenance and operability. It has also been found, that such problems are particularly evident in those hydraulic systems which use phosphate ester based hydraulic fluids and, accordingly, this invention has found considerable application in such systems. However, this invention is not intended to be limited to the measurement of electrokinetic corrosion characteristics of only phosphate ester base hydraulic fluids but may also be used with other fluids where electrokinetic corrosion has presented problems. It is apparent, therefore, that many modifications and variations may be made in the design of this test apparatus and in the manner in which it is used other than those which have been specifically set forth in the discussion of a preferred embodiment thereof without departing from the true scope of the invention.

We claim:

1. A method of determining the electrokinetic corrosion properties of a fluid with respect to a selected material in a hydraulic system comprising the steps of:
   a. conducting said fluid to a wall surface made of the selected material, said fluid forming an electrical double layer comprising a first layer of charged species of one charge bound to the wall surface and a second layer of charged species of opposite charge diffusely distributed apart from the wall surface;
   b. generating a region of predetermined shear variation in the electrical double layer of the fluid at the wall surface; and
   c. measuring the electrical current flow from the wall surface due to said shear variation, said current being determinative of the electrokinetic corrosion properties of the fluid with respect to the selected material.

2. The method as claimed in claim 1 wherein the steps of generating a region of predetermined shear variation comprises accelerating the fluid through an orifice to increase the shear in the direction of fluid flow along the wall surface.

3. The method as claimed in claim 2 additionally including the step of sizing the orifice to generate a shear variation at least as great as that experienced by the fluid in the hydraulic system.

4. A method of determining the electrokinetic corrosion characteristics of a hydraulic fluid on a selected material in a hydraulic system comprising the steps of:
   a. providing an electrode made of the selected material in the fluid stream said electrode having a surface in contact with the fluid whereat the fluid forms an electrical double layer;
   b. generating a region of shear variation in the electrical double layer of the fluid at the surface of the electrode; and
   c. measuring the electrical current flowing between the electrode and the fluid in the region of the shear variation, said current being determinative of the electrokinetic corrosion characteristics of the fluid on the selected material.

5. The method as claimed in claim 4 wherein the step of generating a region of shear variation comprises accelerating the fluid through an orifice near the electrode to increase the shear in the direction of flow over substantially all of the surface of the electrode; and additionally including the step of sizing the orifice to generate a shear variation at least as large as that experienced by the fluid in the hydraulic system.

6. An apparatus for determining the electrokinetic corrosion properties of a fluid with respect to a selected material in a hydraulic system by measuring streaming current driven electrokinetic corrosion current comprising:

a. a housing having an inlet for receiving the fluid and an outlet for discharging the fluid;

b. an electrode electrically insulated from said housing and having a surface in fluid flow communication with said inlet and said outlet;

c. means defining an orifice positioned between said inlet and said electrode, said means creating a region of shear variation in the fluid at the surface of said electrode as the fluid flows therethrough; and d. electrical current measuring means connected between said electrode and said housing for measuring the electrokinetic corrosion current between said electrode and said fluid, said current being determinative of the electrokinetic corrosion properties of the fluid.

7. The apparatus as claimed in claim 6 additionally including valve means positioned between said inlet and said outlet in fluid flow communication with said orifice adapted to selectively reverse the flow of the fluid through said orifice.